United States Patent [19]
Crorey et al.

[11] Patent Number: 5,509,777
[45] Date of Patent: Apr. 23, 1996

[54] MECHANICAL SIDE SHIFT AND TIP APPARATUS

[75] Inventors: David J. Crorey, Utica, Mich.; Leland D. Blatt, 21 Carrington Pl., Grosse Pointe Farms, Mich. 48236

[73] Assignee: Leland D. Blatt, Grosse Pointe Farms, Mich.

[21] Appl. No.: 339,504

[22] Filed: Nov. 14, 1994

Related U.S. Application Data

[63] Continuation of Ser. No. 37,093, Mar. 25, 1993, abandoned.

[51] Int. Cl.$^6$ ................................. B65G 35/00
[52] U.S. Cl. ............................... 414/749; 198/468.6
[58] Field of Search .................... 414/749, 750, 414/751, 752, 753, 782, 222; 198/468.6

[56]  References Cited

U.S. PATENT DOCUMENTS

| | | | |
|---|---|---|---|
| 3,587,888 | 6/1971 | Warren | 414/733 X |
| 3,902,606 | 9/1975 | Ronbeck | 414/733 |
| 4,553,444 | 11/1985 | Blatt | 74/110 |
| 4,730,722 | 3/1988 | Sandrock | 414/749 X |
| 4,988,261 | 1/1991 | Blatt | 414/749 |
| 5,059,090 | 10/1991 | Bobroff et al. | 414/749 |
| 5,148,908 | 9/1992 | Ishizuka et al. | 198/468.6 X |

Primary Examiner—Donald W. Underwood
Attorney, Agent, or Firm—Young & Basile

[57]  ABSTRACT

An article transfer apparatus includes a power driven shuttle carriage mounted for movement along a first linear path between opposite end limits. An article holder assembly includes a base mounted on the carriage for movement relative to the carriage along a second linear path normal to the first linear path between opposite end limits. The holder base mounts a sleeve slidable along an elongate guide rod whose opposite ends may be independently positioned transversely of the first linear path. The guide rod may thus be located to extend parallel to or be inclined relative to the first path to accordingly enable the sleeve to position the holder on the second linear path or to move the holder base transversely of the carriage driving movement of the carriage along the first linear path or may be inclined relative to the first path to accordingly enable the article holder to be adjusted about one axis relative to the base and driven in rotative adjustment relative to the base about the axis relative to the guide rod inclination.

16 Claims, 6 Drawing Sheets

MECHANICAL SIDE SHIFT AND TIP APPARATUS

This application is a continuation of application Ser. No. 08/037,093, filed on Mar. 25, 1993, and now abandoned.

FIELD OF THE INVENTION

The present invention is directed generally to article transfer apparatuses, and more particularly to such an apparatus which receives an article or workpiece from a loading device at a first work station and transfers the workpiece to a second work station at which an unloading device removes the workpiece from the transfer apparatus and loads it into the second work station.

BACKGROUND OF THE INVENTION

Modern assembly lines and the like are continually becoming increasingly complex due to the industry's efforts to further automate them and rely on sophisticated robotic devices. However, this thrust for automation has not come without problems. Many article transfer devices include powered adjustment devices and manual adjustment devices that are mounted on, and ride on a carriage for changing the orientation of a work holder in order to accommodate varying parts and transfer apparatuses. These adjustment devices present clearance problems, and may require considerable power. Further, they may require shutdown of the system for adjustment to handle new parts. Thus, designing systems for handling multiple parts of varying shapes and sizes poses numerous drawbacks.

One such article transfer device is disclosed in Applicant's U.S. Pat. No. 4,988,261. That apparatus includes an article transfer device mounted on a pair of fixed parallel tracks for power driven, longitudinal movement from one end of the tracks to another. Further included in the disclosed device is a work holder mounted upon the shuttle carriage. The work holder is independently adjustable in two types of movement relative to the shuttle carriage while requiring a single supply cable connection to the carriage. In a typical application, the transfer apparatus is positioned to extend between two machines which perform successive operations upon a workpiece. The shuttle carriage is positioned at the end of its track adjacent to the first machine, and an automotive or robotic device is employed to extract a workpiece from the first machine and load the workpiece onto the work holder of the transfer apparatus, which then drives the shuttle carriage with the workpiece to the opposite end of the transfer unit. A second automatic device then removes the workpiece from the shuttle carriage and loads it into the second machine.

Since the loading and unloading of the transfer apparatus is performed by automatic devices, it is important that the work holder of the transfer unit be precisely positioned at each end of its stroke to be in a proper orientation and alignment with the loading or unloading device. Where the production line in which the transfer apparatus is employed handles only workpieces of a single configuration, the problems of establishing the desired alignment between the transfer unit and the loading and unloading devices are simply solved by the initial setup of the unit. However, particularly in automotive related industries, present day practice requires that many production lines, particularly those which employ machines involving a large capital investment, be capable of rapid conversion from production of one part to the production of a different part. Such a changeover, in addition to the required modification of the tooling, can, and usually does, require modifications to the loading and unloading apparatus and changes to the work holder structure and its orientation upon the transfer unit, and possibly a relocation of the end positions of the shuttle carriage.

One example of such a production line is one which is employed to stamp inner door panels for automotive vehicle doors. These inner door panels are employed to mount the door latching and window operating mechanisms and are of a complex shape such that the workpiece blank passes through several successive stamping operations before it is finished. Transfer units of the general type referred to above are employed to transfer the workpiece blank from one press to the next. Typically, two or more different inner door panel configurations are required for each different model of automobile-right and left-hand configurations for two-door automobiles, and right and left front and rear door configurations for four-door automobiles.

Press lines for stamping parts of such complex shape include a series of relatively large presses fixedly mounted on the shop floor in spaced relationship to each other along a straight line. The transfer units extending between adjacent presses will have their longitudinal center lines aligned with the straight line path through the presses. Where it is intended that the line be shifted at fairly frequent intervals from production of one part to the production of a different part, to accomplish a quick change set up, the loading and unloading devices are provided with quick change modular workpiece gripping heads, and a matched set of workpiece holders are provided for the transfer unit, again with quick change couplings accommodating rapid removal and replacement upon a shuttle carriage of the transfer unit. By appropriate design, these matched pairs of workpiece grippers and workpiece holders will minimize or eliminate the necessity for reorientation or realignment of the transfer unit with its associated loading and unloading devices upon conversion from the handling of one part to the handling of another.

However, where the line must be capable of handling several different parts of differing sizes, shapes and configurations, it is frequently necessary to shift the orientation of the part between successive presses. Loading of the part upon the work holder on the shuttle carriage may, for example, be most conveniently accomplished if the work holder is inclined toward the adjacent side of the press from which it receives the part and is reversely inclined for the unloading operation at the opposite end of its stroke. Also, the geometry of a part may be such that shifting the part transversely of its path of travel between the two presses may be desirable.

Shifting of the position of the part relative to the fixed frame of the transfer apparatus during transit from one end of the apparatus to the other will normally require some power device mounted on the shuttle carriage, and the supplying of power to these actuating devices will require the coupling of an electrical cable or pneumatic hose to some point on the carriage. In that the path of travel of a typical shuttle carriage may be ten feet or more, the handling of these power cables or supply lines presents problems, since they must be connected at one end to a stationary power outlet. Guidance and handling of a single line extending from a fixed supply location to the moving carriage can easily be handled with an articulated cable guide of known construction. However, when one or more power supply lines or cables must be attached at one end to a movable shuttle carriage at locations on the carriage which are in turn movable relative to one another, a single cable guide is not sufficient. As a result, the necessity for two or more cable guides leading to the relative movable points on the shuttle present an exceedingly complex design problem.

Thus, it is an object of the present invention to provide an article transfer apparatus which is capable of rapid conversion from production of one part to the production of a different part. It is a further object of the present invention to provide such an apparatus which includes a work holder mounted upon a shuttle carriage for independent adjustable movement in at least two types of movement relative to the shuttle carriage. Still further, it is an object of the present invention to provide such an apparatus which requires no supply cable connection to the carriage and no power devices mounted on the shuttle.

SUMMARY OF THE INVENTION

The present invention addresses and solves the problems enumerated above. The present invention comprises an elongate frame having parallel main guide rail means mounted thereon. Secondary guide rail means are mounted on the frame and transversely extend respectively along opposite ends of the main guide rail means. Shuttle means are mounted on, and moveable along the main guide rail means between opposite ends thereof. Means, mounted on the shuttle means, are provided for carrying an article. The invention further comprises sleeve means, mounted on the shuttle means, for providing movement of the article carrier means relative to the shuttle means transversely of the main guide rail means and pivotally with respect to a pivot axis of the article carrier means. Elongate guide member means, extending longitudinally along the main guide rail means and slidably received on the sleeve means, provide pivotal and transverse movement of the carrier means relative to movement of the shuttle means along the main guide member means. The present invention may further comprise first and second independently operable power drive means slidably mounted on each of the secondary guide rail means and having coupling means for mounting the first and second drive means to each end of the guide member means for providing movement of the guide member means normal with respect to the main guide rail means. Third and fourth independently operable power drive means may be provided for transversely engaging each end of the guide member means mounted thereon.

More specifically, the transfer unit of the present invention includes an elongate frame having a pair of elongate fixed guide rails extending longitudinally of the frame substantially from one end of the frame to the other. A shuttle carriage is mounted upon these guide rails by suitable roller assemblies for straight line movement longitudinally from one end of the frame to the other and may be driven in such movement by a suitable power drive means.

Mounted at each end of the frame are second fixed track assemblies which extend horizontally transversely of the frame perpendicular to the path of travel of the carriage. Each of these transversely extending second tracks slidably carries a guide rod manipulating apparatus which may be positioned along the second tracks by a power drive screw threadably received in a nut fixedly mounted on the manipulator assembly. The purpose of the manipulator assembly is to provide movement of each end of a guide rod normally and transversely with respect to the elongate frame. Transverse movement is accomplished by a power drive screw mounted on the second fixed track assembly and threadably received on the manipulator assembly by the aforementioned fixed screw. Movement of the guide rod member generally normal to the elongate frame is accomplished by a second power drive screw mounted on the manipulator assembly and generally perpendicular to the power drive screw mounted on the second fixed track assembly. The second power drive screw is threadably received on a bracket which holds a pair of push rods, one of which holds the guide rod assembly. The guide rods are guided in a direction normal to the elongate frame by sleeve assemblies mounted on the manipulator assembly. Upon actuation of the second power drive screw, the two push rods may be independently positioned at any location normal of the elongate frame. Each push rod acts as an alternative to one another for utilizing maximum transverse movement of the guide rod end by choosing either of the push rods for the location of the guide rod end corresponding to the particular application. The guide rod ends are thus correspondingly located relative to the fixed frame and may be thus selectively positioned to extend in parallel relationship to the path of travel of the shuttle carriage or in an inclined relationship to the path of travel of the carriage.

A pair of support rods which extend horizontally of the shuttle carriage are mounted on the shuttle carriage in a direction normal to the path of travel of the carriage. A work holder carrier is slidably mounted upon the support rods for movement relative to the shuttle carriage along a path extending normal to the path of travel of the carriage.

A guide sleeve slidably received on the guide rod is coupled to the work holder by a ball and socket assembly for transverse movement of the shuttle carriage relative to the elongate frame. A pivot lever is mounted at one end on the guide sleeve and at another end on the article holder for pivotal movement of the article holder relative to the guide sleeve which moves in unison with the guide rod. Thus, during travel of the shuttle carriage longitudinally of the frame from one end to the other, the work holder carrier will be shifted transversely of the shuttle in accordance with the amount by which the opposite ends of the guide rod are transversely offset from the longitudinal center line of the frame. Thus, transverse shifting movement of the work holder carrier is achieved without requiring the connection of a power cable to the shuttle carriage. Also, pivotal movement of the article holder is accomplished by a preselected inclined orientation of the guide rod with respect to the elongate frame pivoting the article holder with the lever attached to the sleeve at one end and the article holder at the other. Thus, pivotal movement of the article holder is accomplished without requiring the connection of a power cable to the shuttle carriage or the article holder.

As a result, no power cable connection is required to the shuttle while both transverse and pivotal movement of the article holder is effectively accomplished. Power drive assemblies mounted on the second fixed track assemblies accomplish all the movement needed for the shuttle carriage and article holder.

The work holder base is provided with a quick change coupling by means of which work holders of different configurations may be mounted upon the base. The quick change coupling means are also provided on the push rods for quick change coupling of the guide rod when different ranges of transverse movement of the guide rod are required for the particular application.

BRIEF DESCRIPTION OF THE DRAWINGS

Other objects, features and advantages of the present invention will become apparent by reference to the following detailed description and drawings, in which.

DESCRIPTION OF THE PREFERRED EMBODIMENT

Figure 1:
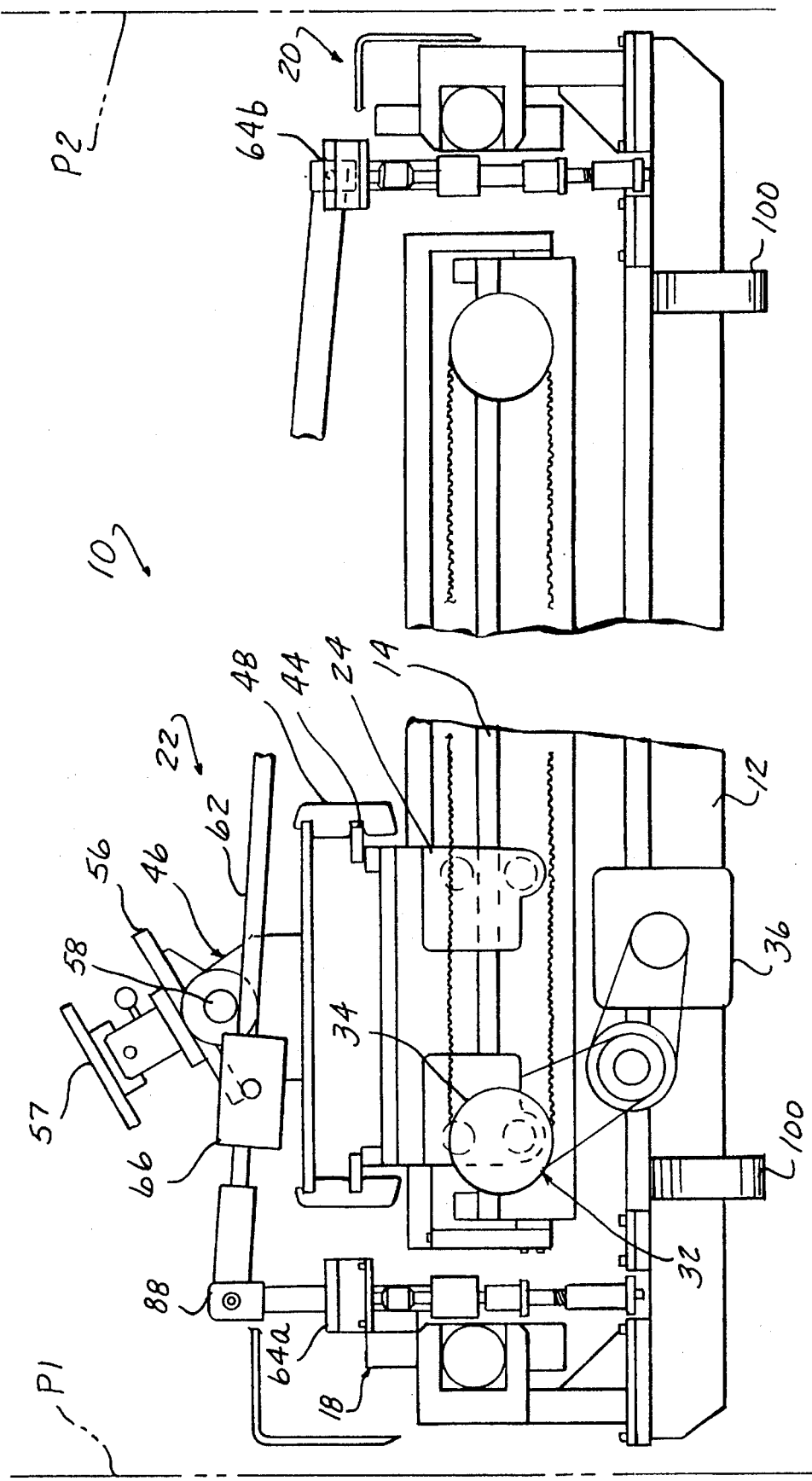
FIG. 1 is a simplified side elevational view, partially broken away, of a transfer apparatus embodying the present invention.
Figure 5:
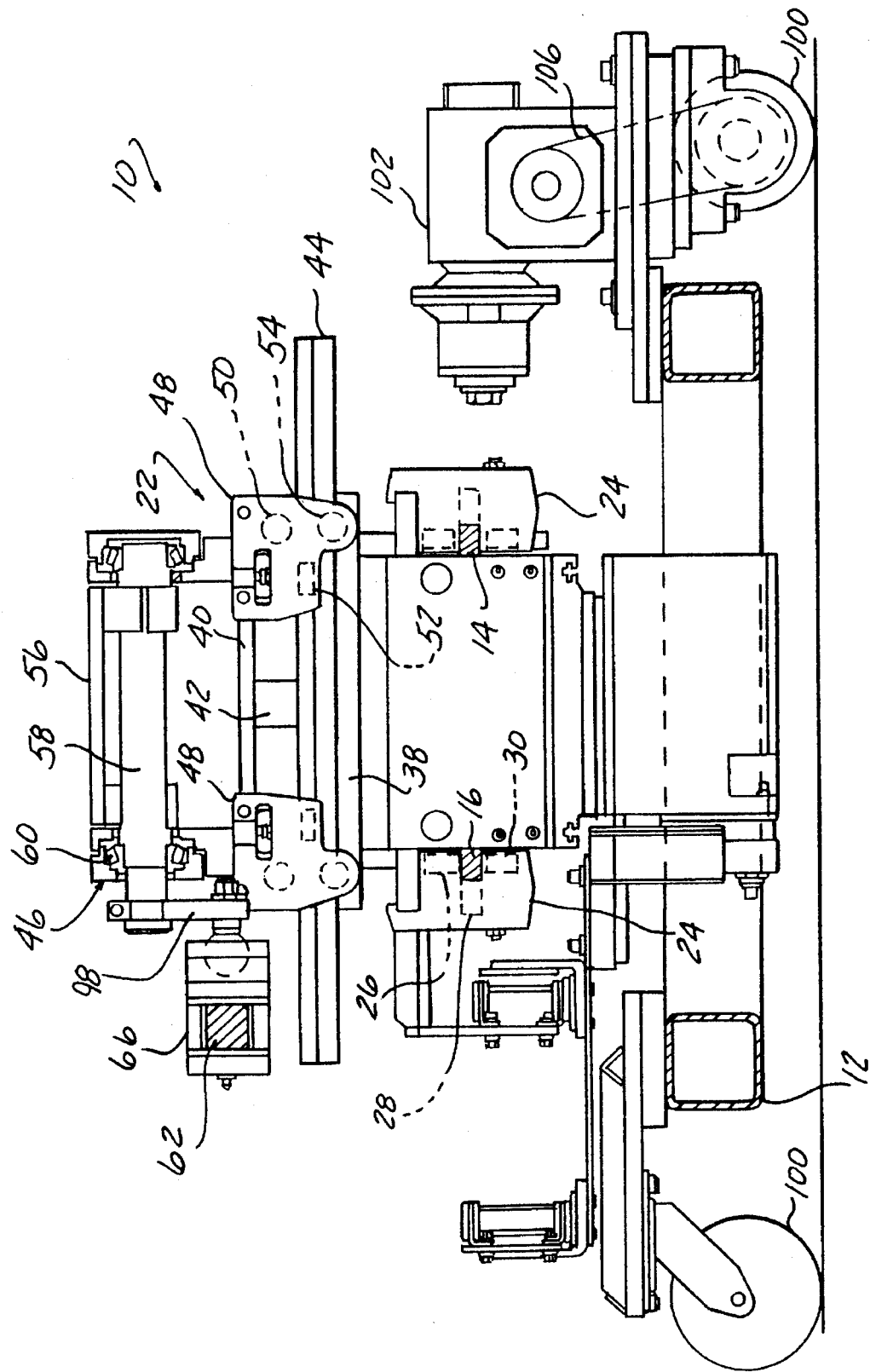
FIG. 5 is a detailed side elevational view of a shuttle carriage assembly employed in the transfer apparatus of FIG. 1 with certain parts broken away.

A transfer apparatus 10 embodying the present invention includes, as best seen in FIG. 5, an elongate rigid frame 12 upon which are fixedly mounted a pair of elongate guide rails 14, 16 which extend substantially the entire length of the frame 12. Also fixedly mounted on the frame 12 are first and second secondary guide rails 18, 20, as best seen in FIG. 1. A shuttle carriage assembly designated generally 22 is mounted upon guide rails 14, 16 by roller assemblies 24 each of which, as best seen in FIG. 5, includes three freely rotatable rollers 26, 28, 30 respectively engaged with the upper, outer and lower surfaces of guide rails 14, 16.

Referring now to FIG. 1, shuttle carriage assembly 22 is driven in movement along guide rails 14, 16 by a suitable power drive assembly which, in the form shown in the drawings, takes the form of an elongate belt drive system 32 operatively received on belt gears 34 fixedly mounted on frame 12. Belt system 32 is driven by reversible drive motor 36 mounted on frame 12. Belt system 32 is employed in the preferred embodiment. However, it is to be understood that any suitable conventional shuttle carriage drives employed in transfer units of this general type may be used in the present invention. The rack and pinion drive disclosed in U.S. Pat. No. 4,553,444 is another example of a drive widely used in applications of this type. A further suitable example takes the form of an elongate power driven screw, as shown in U.S. Pat. No. 4,988,261, which is operatively received within a ball nut fixedly mounted on the bottom of a carriage. The particular type of drive which is used will depend upon the application of the transfer apparatus and is usually selected with consideration of the weight of the article to be handled, the speed at which the article is to be transferred, and the degree of precision required of the drive in locating the carriage at each end of its path of travel on the guide rails.

As seen in FIG. 5, the shuttle carriage assembly 22 of the transfer unit of the present invention includes as the basic shuttle carriage a rigid lower carriage plate 38 upon which the roller assemblies 24 are fixedly mounted. A rigid upper carriage plate 40 is fixedly mounted upon the top of the lower carriage plate 38 as by spacer blocks 42. Mounted on upper carriage plate 40 are article carrier guide rails 44 extending transversely across the shuttle carriage assembly 22 with respect to the main guide rails 14, 16. An article carrier assembly 46 is slidably mounted on the article carrier guide rails 44 by roller assemblies 48. The roller assemblies 48 include freely rotatable rollers 50, 52, 54 respectively engaged with the upper, outer and lower surfaces of article carrier guide rails 44 for non-frictional transverse movement of the article carrier assembly 46 with respect to the main guide rails 14, 16. The article carrier assembly 46 includes an article holder 56 pivotally mounted on the article carrier assembly. Pivotal movement of the article holder 56 is provided by the holder's pivot axle 58 rotatably mounted on the article carrier assembly 46 by freely rotatable axle rollers 60.

The article holder 56 of the present invention may also optionally, but preferably include a quick-change coupling device 57 as shown in FIG. 1 fixedly mounted at the top of the article holder 56. An example of such a coupling device 57 is more fully described in U.S. Pat. No. 4,988,261. However, it is to be understood that coupling device 57 is not required for proper operation of the present invention.

Figure 2:
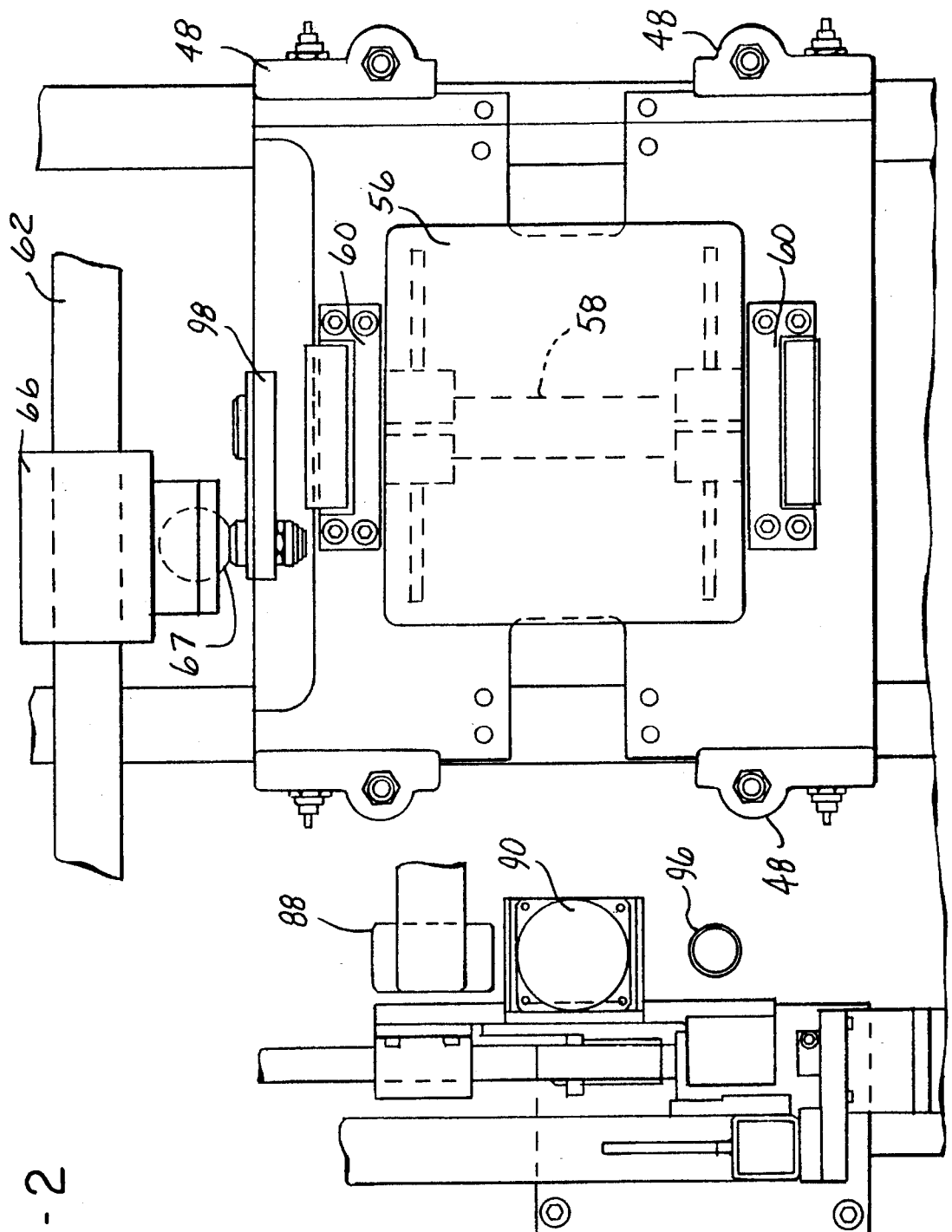
FIG. 2 is a simplified top view of the transfer apparatus of FIG. 1 with certain parts broken away.

As seen in FIG. 5, transverse movement of the article carrier assembly 46 and rotational movement of the article holder 56 is accomplished via relative movement of a guide member 62 with respect to the article carrier assembly 46. The guide member 62 is pivotally mounted on two axes at each end on guide member support assemblies 64a and 64b located adjacent opposite ends of frame 12. As best seen in FIGS. 1 and 2, sleeve assembly 66 is received upon the guide member 62 for free sliding movement longitudinally along guide member 62 and is mounted on the article carrier assembly by a ball and socket hitch 67 for free pivotal movement about two axes.

Figure 3:
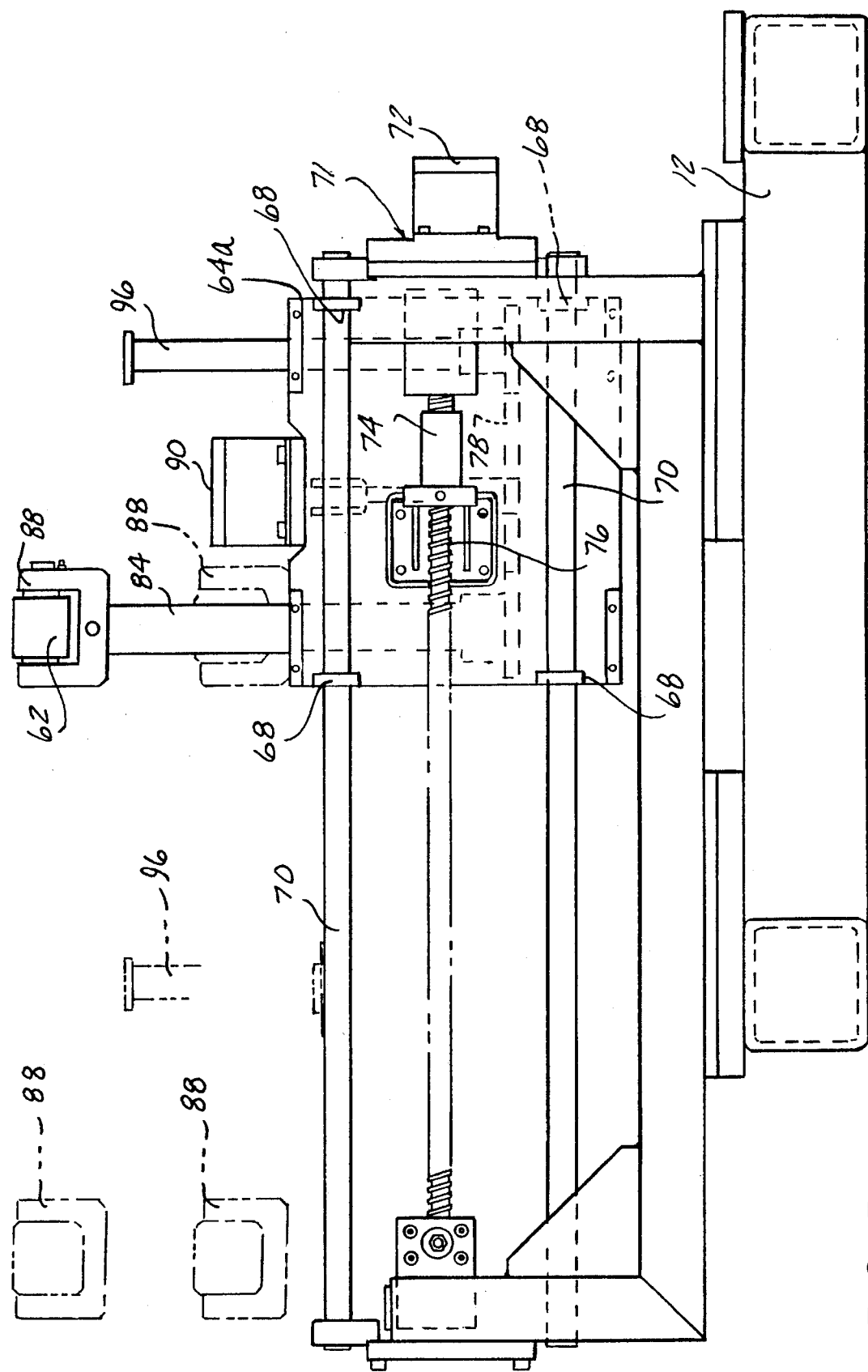
FIG. 3 is a detailed front view of a secondary guide rail employed in the transfer apparatus of FIG. 1 with certain parts broken away.
Figure 4:
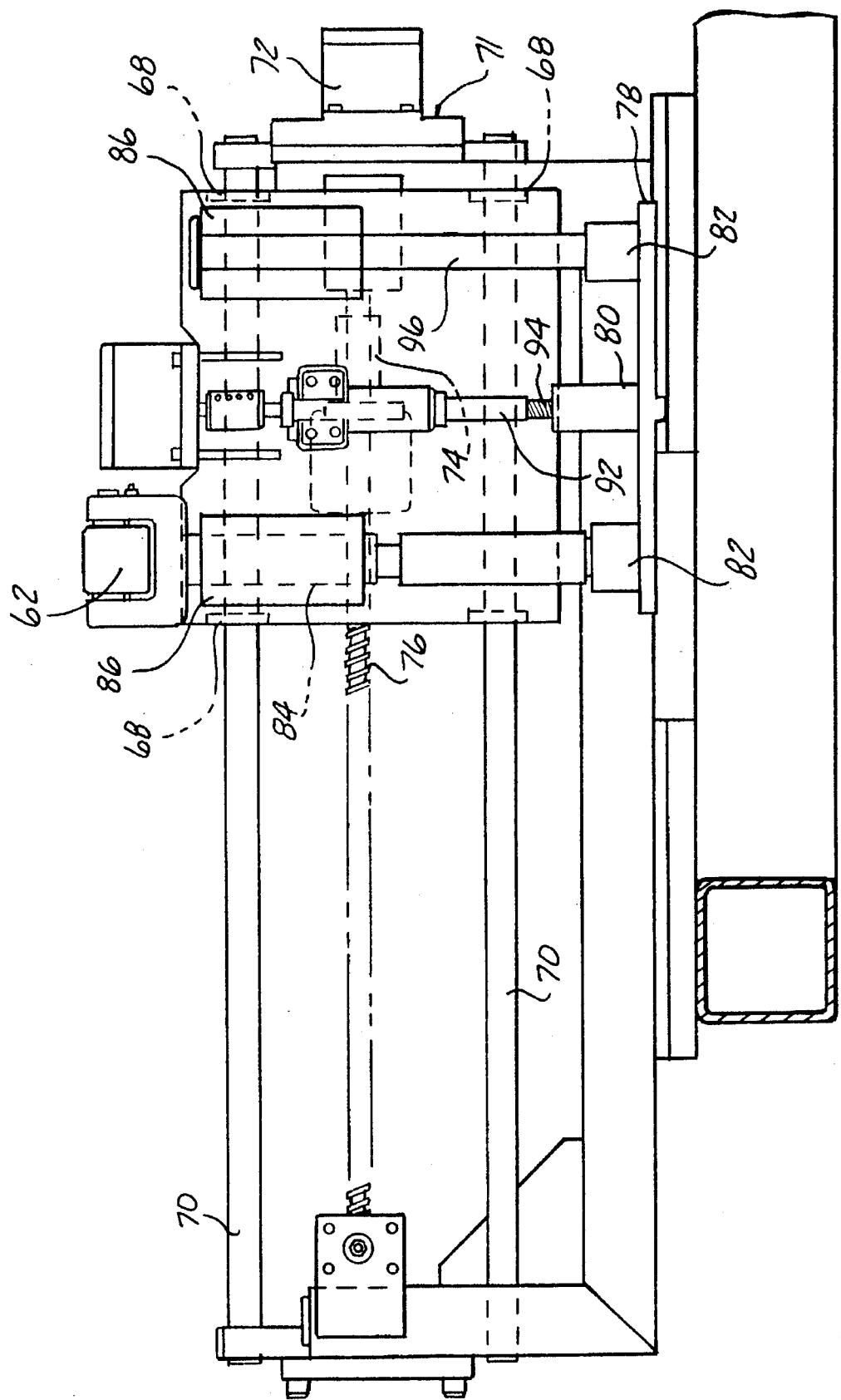
FIG. 4 is a detailed view of the secondary guide rail assembly of FIG. 3 viewed from the shuttle side of the assembly.

Details of guide member support assemblies 64a and 64b are best seen in FIGS. 3 and 4.

Guide member support assemblies 64a and 64b are of similar construction, and the following description of guide member support assembly 64a is equally applicable to assembly 64b. As best seen in FIG. 3, guide member support assembly 64a is slidably guided along secondary guide rail 18 by anti-frictional guides 68 slidably mounted on guide rods 70. The guide member support assembly 64a is moved along secondary guide rail 18 by reversible power screw drive 71 including a fixed nut assembly 74 fixedly mounted on the guide member support assembly 64a, a power screw thread 76 rotatably mounted on secondary guide rail 18 and threadably received in the fixed nut assembly 74, and a reversible drive motor 72 fixedly mounted on the secondary guide rail means 18. FIG. 4 shows the structure of the guide member support assembly 64a that provides normal movement of the ends of the guide member 62 including a bracket 78 with a centrally located fixed nut assembly 80 and two push rod couplers 82 located on each side of the bracket 78, a first push rod 84 received in the push rod coupler 82 and slidably received in push rod guide 86, a support block 88 for pivotally mounting the guide member 62 thereon, a reversible drive motor 90 fixedly mounted on the guide member support assembly 64a for driving a drive shaft 92 having power screw threads 94 and threadably received in fixed nut assembly 80 located on the bracket 78 for moving the bracket 78 and thus the end of the guide member 62 normally with respect to the frame 12, and a secondary push rod 96 as an alternative mount for the support block 88 for utilizing additional transverse movement of the guide member support assembly 64a and thus for the guide member 62. Pivotal movement of the article holder 56 is accomplished by a pivot member 98 mounted on one end on the sleeve assembly 66 and at another end on the article holder 56. Upon normal movement of the guide member 62 with respect to the frame 12 at the point of the sleeve assembly 66, the pivot member 98 pivots the article holder 56 about the pivot axle 58 in a direction relative to movement of the guide member 62.

Figure 6:
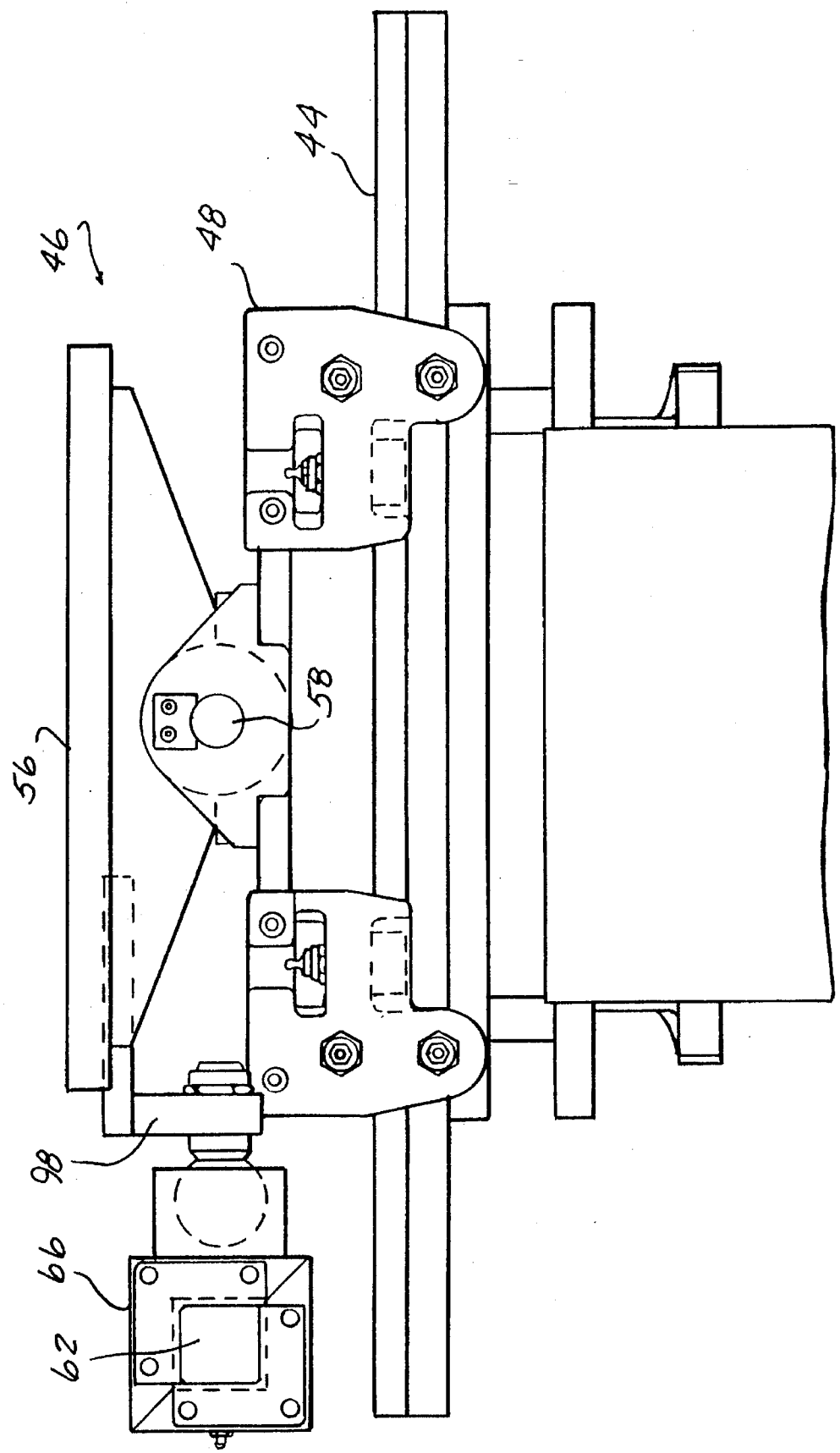
FIG. 6 is a detailed front elevational view of a second embodiment of the shuttle assembly.

To accommodate the loading and unloading of an article, the pivot axle 58 is substantially perpendicular to the guide member 62, as seen in FIGS. 1, 2 and 5, to allow the article holder 56 to pivot toward the secondary guide rails 16, 18. In another embodiment, the pivot axle 58 may be mounted substantially parallel to said guide member 62, as seen in FIG. 6. This allows the article holder 56 to pivot toward and away from the ends of the secondary guide rails 16, 18 should the loading and unloading of an article require such orientation.

Referring now to FIG. 1, in a typical application, the transfer unit will be positioned between two machines such as a first press P1 and a second press P2 to transfer a part from press P1 to press P2. When a line is shifted from production of one part to the production of a second part, it is necessary to change the dies in the two presses, and a transfer unit may be located in position such that it interferes with the die changing operation. Where this situation exists, as seen in FIG. 5, the transfer unit may be provided with casters 100, at least one pair of which are driven by a reversible drive motor 102 mounted on frame 12 and drivingly coupled to casters as by a belt drive 106 driven by motor 102 or by a chain and sprocket drive (not shown).

The configuration of article holder 56 is matched to the part or workpiece to be transferred by the transfer unit. The unit is widely employed to transfer sheet metal parts from one press to another, and a typical part of this type is an inner door panel for a vehicle door which is especially formed and configured to mount and support the door latch and window operating mechanisms of the completed door. This particular panel is formed with a number of openings of various sizes and shapes and with several indentations or projection portions which are offset to one side or another of the general plane of the panel. For handling parts of this type, referring now to FIG. 1, the article holder 56 will take the form of a platform (not shown) whose upper surface is confronted to one side surface of the part to be handled, this upper surface being conveniently produced by forming a mold of suitable plastic material directly from the surface of the part itself. Preferably, but not necessarily, the upper surface of the platform (not shown) may include one or more projections shaped to pass through openings in the part. A part holder of this type just described is sometimes referred to as a nest for the part in which the part is gravitationally seated during the transfer operation. Such a nest provides a fairly precise location and orientation of the part relative to the work holder and does not require that the holder be equipped with a pneumatic supply line to actuate and release the part holding clamps.

For purposes of explaining the operation of the transfer unit described above, it will be assumed that the unit is set up as indicated generally in FIG. 1 between two presses for the purpose of transferring a sheet metal part, such as an automotive inner door panel from press P1 to press P2. Automatic loading and unloading units (not shown) of well-known construction will be employed adjacent press P1 to extract the part from the press and load it onto the work holder platform of the transfer unit when the shuttle carriage 22 is at that end of its path of movement adjacent press P1. When the carriage is at its opposite end limit of movement, an unloading unit (not shown) will lift the part from the work holder and load it into press P2. Loading and unloading units suitable for this purpose are well-known and basically consist of a power driven articulated arm detachably coupled at its outer end to a rigid frame which carries a group of vacuum cups arranged in a pattern matched to the part to be handled to stably support the part from the frame when the vacuum is applied to the cups. The frame typically is coupled to the articulated arm by a quick disconnect pneumatic coupling for induced vacuum in the cups when the frame is attached to the arm. Conversion of a system from handling one part to the handling of a different part will require a corresponding change of the vacuum cup holding frames of the loading and unloading devices.

To transfer a part from press P1 to P2, the transfer unit is first located in the correct position between two presses. The guide member support assemblies 64a, 64b are then independently positioned by the operation of their screw drive motors to locate the respective opposite ends of the guide member 62 transversely and normally of the frame 12 as may be required by the part configuration, orientation of the dies and presses P1 and P2 relative to one another and operating paths of the respective loading units which transfer the part on the press to the transfer unit and vice versa. Shuttle carriage 22 is then positioned at its left hand end limit of travel as viewed in FIG. 1 by actuating of its belt drive system 32. Usually, it is most convenient to have the article holder 56 when in its part receiving position, tilted downwardly toward the left as viewed in FIG. 1 because this will in most cases provide additional clearance and simplification of the path of movement of the loading device in transferring a part from press P1 to the platform.

After the part has been loaded on the article holder 56, the shuttle drive motor is actuated to drive the shuttle carriage to the opposite end of its path of movement along the rails 14, 16.

Referring now to FIG. 2, if the guide member 62 has been positioned in an inclined relationship to the longitudinal center line of frame 12, as shuttle carriage 22 moves to the right as viewed in FIG. 2, the sleeve assembly 66 which is mounted on the article carrier assembly 46 will, as it slides to the right along the guide member 62, force the article carrier assembly 46 transversely of shuttle carriage 22 by virtue of the inclination of the guide member 62 with respect to the path of movement of the shuttle carriage. Thus, the article holder assembly and the part carried by the assembly may be shifted a predetermined distance transversely of the path of travel of the shuttle carriage during its movement between the two presses.

Referring again to FIG. 1, if the guide member 62 is positioned at an inclined relationship with respect to the opposite ends of the frame 12, the article holder will pivot from one position at one end of the frame 12 to another pivot position when moved to the other end of the frame 12.

While preferred embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. An article transfer apparatus, comprising:

an elongate frame defining a plane;

a substantially parallel main guide rail means longitudinally mounted on said frame;

secondary guide rail means mounted on said frame and transversely extending respectfully along opposite ends of said main guide rail means;

shuttle means mounted on, and moveable along said main guide rail means between opposite ends thereof;

article carrier guide rail means mounted on said shuttle means and extending transversely with respect to said main guide rail means;

article carrier assembly means movably coupled to said article carrier guide rail means for movement along said article carrier guide rail means;

means, pivotally connected to said article carrier assembly means, for holding an article;

sleeve means, pivotally coupled to said holding means;

elongate guide member means having opposite ends and extending longitudinally in the direction of said main guide rail means and slidably received by said sleeve means; and means mounted on said secondary guide rail means for moving each of said opposite ends of said guide member means in a separate plane substantially normal to said plane of said frame to provide pivotal movement of said holding means relative to said article carrier assembly means and to provide movement of said article carrier assembly means along said article carrier guide rail means when said shuttle means is moved along said main guide rail means.

2. The article transfer apparatus of claim 1, wherein said moving means comprises:

first and second means for supporting said opposite ends of said guide member means, and said supporting means slidably connected to said secondary guide rail means; and first and second independently operable power drive means mounted to said first and second support means respectfully and providing movement of said opposite ends of said guide member means in a vertical direction in said separate planes substantially normal to said plane of said frame.

3. The article transfer apparatus of claims 2 wherein said moving means further comprises third and fourth independently operable power drive means mounted to said secondary guide rail means and driving said first and second support means respectfully along said secondary guide rail means thus moving said opposite ends of said guide member means in a horizontal direction in said separate planes substantially normal to said plane of said frame.

4. The article transfer apparatus of claim 1, wherein said article holding means further comprises:

a pivot member pivotally mounted at one end to said sleeve means and fixedly mounted at another end to said article holding means for allowing pivotal movement of said article holding means relative to said article carrier assembly means about a pivot axis substantially parallel to said plane of said frame when said guide member means moves in a plane substantially normal to said plane of said frame.

5. The article transfer apparatus of claim 1, wherein said sleeve means further comprises:

a hollow tubular sleeve for slidably receiving said guide member means; and means for mounting said article holding means to said sleeve for pivotal movement of said article holding means relative to said article carrier assembly about an axis substantially parallel to said plane of said frame when said guide member means moves in a plane substantially normal to said frame, and said sleeve sliding longitudinally along said guide member means when said shuttle means moves along said main guide rail means, and said sleeve operable to position said article carrier assembling means along said article carrier guide rail means in accordance with the position of said guide member means relative to said secondary guide rail means, 6. The article transfer apparatus of claim 2, wherein each of said first and second means for supporting said guide member means further comprises:

a guide member support slidably mounted to said secondary guide rail means;

at least one push rod slidably mounted to said guide member support;

a support block mounted to one end of said push rod and having said guide member means coupled thereto; and a bracket coupled to the opposite end of said push rod and said first and second power drive means driving said brackets, said push rods and said support blocks to provide movement of said guide member means in a plane substantially normal to said plane of said frame.

7. An article transfer apparatus, comprising:

an elongate frame defining a plane;

substantially parallel main guide rails longitudinally mounted on said frame;

first and second transversely extending secondary guide rails located respectfully at opposite ends of said main guide rails;

a shuttle mounted on and movable along said main guide rails;

a pair of substantially parallel article carrier guide rails mounted on said shuttle and extending transversely with respect to said main guide rails;

an article carrier assembly movably coupled to said article carrier guide rails for movement along said article carrier guide rails;

an article holder pivotally mounted on said article carrier assembly;

an elongated guide member extending longitudinally along said main guide rails;

a first and second guide member support slidably mounted to said first and second secondary guide rails respectively;

at least one push rod slidably mounted to each of said first and second guide member supports;

a support block mounted to one end of each of said push rods and having said guide member coupled thereto;

a first and second bracket coupled to the opposite end of said push rods;

first and second independently operable powered drive means mounted to said first and second guide member support respectively and coupled to said first and second bracket respectively, and said first and second power drive means driving said first and second bracket, said push rods and said support blocks to provide movement of said guide member in a plane substantially normal to said plane of said frame;

third and fourth independently operable power drive means mounted to said secondary guide rail means and driving said first and second guide member supports along said secondary guide rails thus moving said guide member in a plane substantially parallel to said plane of said frame;

a hollow tubular sleeve slidably receiving said guide member;

means for pivotally connecting said article holder to said sleeve for pivotal movement of said article holder about an axis substantially parallel to said plane of said frame when said guide member moves in a plane substantially normal to said frame, and said sleeve sliding longitudinally along said guide member when said shuttle means moves along said main guide rail means and said sleeve operable to position said article carrier assembly along said article carrier guide rails in accordance with the position of said guide member relative to said secondary guide rail means.

8. The article transfer apparatus of claim 1, further comprising;

means for powering movement of said shuttle means along said main guide rail means.

9. The article transfer apparatus of claim 1, further comprising:

means for adjustably moving the article transfer apparatus.

10. The article transfer apparatus of claim 7, further comprising:

a plurality of caster wheels rollably mounted on said frame; and means for powering movement of said caster wheels.

11. An article transfer apparatus, comprising:

an elongate frame defining a plane;

a substantially parallel main guide rail means longitudinally mounted on said frame;

shuttle means mounted on, and moveable along said main guide rail means between opposite ends thereof;

article carrier guide rail means mounted on said shuttle means and extending transversely with respect to said main guide rail means;

article carrier assembly means movably coupled to said article carrier guide rail means for movement along said article carrier guide rail means;

means, pivotally connected to said article carrier assembly means, for holding an article;

sleeve means, pivotally coupled to said holding means;

elongate guide member means having opposite ends and extending longitudinally in the direction of said main guide rail means and slidably received by said sleeve means; and means, mounted on said frame, for moving each of said opposite ends of said guide member means in a separate plane substantially normal to said plane of said frame to provide pivotal movement of said holding means relative to said article carrier assembly means and to provide movement of said article carrier assembly means along said article carrier guide rail means when said shuttle means is moved along said main guide rail means.

12. The article transfer apparatus of claim 11, wherein said moving means comprises:

secondary guide rail means mounted on said frame and transversely extending respectfully along opposite ends of said main guide rail means;

first and second means for supporting said opposite ends of said guide member means, and said supporting means slidably connected to said secondary guide rail means; and first and second independently operable power drive means mounted to said first and second support means respectfully and providing movement of said opposite ends of said guide member means in a vertical direction in said separate planes substantially normal to said plane of said frame.

13. The article transfer apparatus of claims 12 wherein said moving means further comprises third and fourth independently operable power drive means mounted to said secondary guide rail means and driving said first and second support means respectfully along said secondary guide rail means thus moving said opposite ends of said guide member means in a horizontal direction in said separate planes substantially normal to said plane of said frame.

14. An article transfer apparatus, comprising:

means for shuttling an article along a predetermined first path of travel;

article carrier means for moving said article along a predetermined second path of travel extending transversely of said first path and for pivotally moving said article in at least one degree of motion; and guide member means, extending along said first path of travel and pivotally connected to said article carrier means, for providing pivotal movement of said article in said at least one degree of motion and for providing movement of said article along said second path of travel when said shuttle means is moved along said first path of travel.

15. The article transfer apparatus stated in claim 14 wherein said article carrier means further comprises:

an article carrier assembly movably coupled to said shuttle means; and means, pivotally connected to said article carrier assembly, for holding said article.

16. The article transfer apparatus stated in claim 14, wherein said shuttling means comprises:

main guide rail means for defining said first path of travel; and a shuttle movably mounted on said main guide rail means for movement along said first path of travel.

* * * * *